United States Patent Office 3,792,123
Patented Feb. 12, 1974

3,792,123
THERMOPLASTIC COMPOSITION COMPRISING A POLYPHENYLENE ETHER AND A NORMALLY RIGID RESINOUS PRODUCT OF AN ACRYLIC MONOMER AND DIENE RUBBER
Visvaldis Abolins, Delmar, and Donald L. Reinhard, Albany, N.Y., assignors to General Electric Company
No Drawing. Continuation-in-part of application Ser. No. 873,663, Jan. 3, 1969. This application Aug. 23, 1972, Ser. No. 283,094
Int. Cl. C08f 15/00, 19/00
U.S. Cl. 260—876 R
24 Claims

ABSTRACT OF THE DISCLOSURE

This invention relates to a polyphenylene ether composition having improved impact resistance. The composition comprises a polyphenylene ether and a normally rigid resinous product of an acrylic monomer and a diene rubber, the resinous acrylic-rubber product being present in an amount of from 1 to 25 parts by weight per 100 parts of the total resinous components. The addition of the resinous product of acrylic monomer and diene rubber provides unexpected improvements in toughness of parts molded therefrom, and in a preferred embodiment, these properties are improved without substantially impairing gloss or surface appearance.

CROSS-REFERENCE TO RELATED APPLICATION

This application is a continuation-in-part of copending application Ser. No. 873,663, filed Nov. 3, 1969.

This invention relates to mixed synthetic resins and more particularly, to a mixed polymer composition comprising a polyphenylene ether and a resinous product of an acrylic monomer with a diene rubber.

BACKGROUND OF THE INVENTION

The polyphenylene ethers are known and described in numerous publications including Hay, U.S. Pats. 3,306,874 and 3,306,875 and Stamatoff, U.S. Pats. 3,257,357 and 3,257,358. The high molecular weight polyphenylene ethers are high performance engineering thermoplastics possessing relatively high melt viscosities and softening points i.e., in excess of 275° C., and are useful for many commercial applications requiring high temperature resistance including formation of film, fiber and molded articles.

Although they have the above-described desirable properties, it is also known that certain properties of the polyphenylene ether resins are undesirable for some commercial uses. For example, parts molded from the polyphenylene ethers are somewhat brittle due to poor impact strength. In addition, the relatively high melt viscosities and softening points are considered a disadvantage for many uses. Films and fibers can be formed from polyphenylene ether resins on a commercial scale using solution techniques, but melt processing is commercially unattractive because of the high temperatures required to soften the resin and the problems associated therewith such as instability, discoloration and the requirement for specially designed process equipment to operate at elevated temperatures. Molded articles can be formed by melt processing techniques, but, again, the high temperatures required are undesirable.

It is known in the art that properties of the polyphenylene ether resins can be materially altered in combination with other polymers. For example, one method for improving the melt processability of the polyphenylene ethers is disclosed in a commonly-assigned patent, U.S. 3,379,792, incorporated herein by reference. According to this patent, flow properties of the polyphenylene ether resins are improved by blending with from about 0.1 to 25 parts by weight of a polyamide. In another commonly-assigned patent, U.S. 3,361,851, a polyphenylene ether composition comprising a polyphenylene ether blended with a polyolefin is disclosed. The polyolefin is added to improve impact strength and resistance to aggressive solvents. In a third commonly-assigned patent, U.S. 3,383,435, there is provided means for simultaneously improving the melt processability of the polyphenylene ether resins while simultaneously up-grading many properties of polystyrene resins. The invention of this third patent is based upon the discovery that the polyphenylene ether resins and polystyrene resins, including modified polystyrene resins, are combinable in all proportions and result in compositions having many properties improved over those of either of the components. In a fourth commonly-assigned patent, U.S. 3,383,340, elastomeric rubber compositions reinforced with a 2,6-substituted polyphenylene oxide are described, which have at least 40% rubber contents. It is therein disclosed that adding polyphenylene oxide reinforcing filler to rubber makes it possible to obtain increases in tensile strength approximating those obtainable with conventional reinforcing fillers (e.g., carbon black), without causing discoloration of the basic rubber compositions. The compositions described in the said fourth patent, MacCallum et al., U.S. 3,383,340, are all elastomeric, and not normally rigid thermoplastics as are described in the first three above-mentioned patents and in the present disclosure.

One preferred embodiment of the third patent, U.S. 3,383,435, is a composition comprising a high-impact, rubber reinforced polystyrene and a poly(2,6-dialkyl-1,4-phenylene)ether. This composition was preferred because it provided the aforementioned objectives of improving the melt-processability properties of the polyphenylene ether resin and provided the further advantage of improving impact resistance of parts molded from the blend. Furthermore, the composition of the polyphenylene ether and the high impact polystyrene could be custom-formulated to provide predetermined properties ranging between those of the polystyrene and those of the polyphenylene ether by controlling the ratio of the two polymers. The reason for this is that the composition exhibits a single set of thermodynamic properties rather than two distinct sets of properties i.e., one for each of the components of the blend as is typical with blends of prior art.

The elastomeric compositions of the fourth patent, U.S. 3,383,340, are useful for resilient, vulcanized molded objects, such as tire treads, shock mountings and the like, where light colored, abrasion resistant resilient elastomers are used. This field of use is entirely remote from the thermoplastic molding art with which the present invention is concerned, the final articles in this instance being normally rigid and not resilient. This contrast in external properties is particularly true in distinguishing the elastomeric embodiment comprising a rubber copolymer of butadiene and methyl methacrylate blended with polyphenylene ether described in U.S. Pat. 3,383,340 from the normally rigid thermoplastic embodiments to be described herein comprising a polyphenylene ether resin combined with a graft copolymer of an acrylic monomer component and a polybutadiene rubber or with a blend of an acrylic resin with a polybutadiene rubber.

With respect to the preferred embodiments in U.S. Pat. 3,383,435, it is believed that the impact resistance of the polyphenylene ether resins is improved because of the diene rubber content in the high-impact polystyrene and in this respect, the improvement in impact strength appears to be directly proportional the diene rubber content of the polystyrene resin, increasing concentrations of diene rubber resulting in increased impact strength. However, it has also been found—as a disadvantage—that the gloss of a part molded from the polyphenylene ether resin and the high impact polystyrene resin is inversely proportional to the diene rubber content and that therefore as the diene rubber content is increased, gloss and surface appearance of the molded parts are decreased. Consequently, increasing the diene rubber contents of the compositions result in increased impact strength, but with a sacrifice of surface appearance and gloss. Alternatively, reduction in diene rubber content such as by the use of unreinforced (crystal) polystyrene results in parts having good gloss, but at a sacrifice in impact strengths. Because both impact strength and gloss are commercially important properties in the manufacture of molded parts, although the preferred compositions of U.S. Pat. 3,383,435 provide the advantages noted above, it has been found difficult to provide compositions having optimum impact strength and surface appearance.

It has now been discovered that a rubber modified acrylic resin, i.e., a normally rigid, resinous graft polymerization product of the acrylic monomer component in a mixture comprising an acrylic monomer and a diene rubber or a blend of an acrylic resin with a diene rubber, will impart unexpectedly high impact resistance and toughness properties both to polyphenylene ether resins and to compositions of polyphenylene ether resins and polystyrene resins. This will be achieved without substantially altering or decreasing the gloss and surface appearance of parts molded from the composition. For example, a piece molded from a composition comprising 85 parts of polyphenylene ether resin and 15 parts of a poly (methyl methacrylate) graft interpolymer with a polybutadiene rubber had an Izod impact strength of 7.12 ft. lbs./per in. notch and a gloss value which was equal to or slightly higher than that of the polyphenylene ether alone. Furthermore, a composition of 50 parts of poly(2,6-dimethyl-1,4-phenylene)ether resin, 35 parts of a polybutadiene rubber modified polystyrene resin and 15 parts of the same acrylic resin graft interpolymer could be molded into a part with an Izod impact strength of 5.76 ft. lbs./in. notch and similar, high gloss. Such compositions can also be reinforced with fibrous glass with enhancement in physical properties and no loss of excellent gloss and surface appearance. All such compositions have higher impact strengths, greater tensile elongations and substantially improved surface appearance than the corresponding compositions of the prior art in which the polybutadiene resinous component is not modified by the acrylic resin. In addition, the new, normally rigid thermoplastic compositions have unusually good resistance to distortion by heat.

DESCRIPTION OF THE INVENTION

According to the present invention there are provided normally rigid thermoplastic compositions comprising:
(a) A polyphenylene ether of the formula

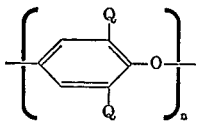

wherein the oxygen ether atom of one unit is connected to the benzene nucleus of the next adjoining unit; $n$ is a positive integer and is at least 50, and each Q is a monovalent substituent selected from the group consisting of hydrogen, halogen, hydrocarbon radicals, halohydrocarbon radicals having at least two carbon atoms between the halogen atom and phenyl nucleus, hydrocarbonoxy radicals, and halohydrocarbonoxy radicals having at least two carbon atoms between the halogen atom and phenyl nucleus and
(b) A normally rigid, resinous graft polymerization product of the acrylic monomer component of a mixture comprising an acrylic monomer and a diene rubber in an amount of from about 1 to about 25% by weight of the total resinous components of the composition.

Preferred compositions will be those in which the polyphenylene ether resin comprises at least 40 percent by weight of the total resinous components in the composition. Also preferred are compositions which contain rubber modified high impact polystyrene in addition to the polyphenylene ether and the graft polymerization product.

Where the rubber-modified acrylic resin contains a minor amount of styrene added in either the form of a styrene-butadiene copolymer in the backbone, or, preferably, grafted before or with the acrylic monomer component, improved toughness is achieved without sacrifice in gloss or appearance properties. Other preferred compositions comprise at least 40 parts of a poly(2,6-dialkyl-1,4-phenylene)ether resin, from about 30 to 50 parts of a high impact, e.g., rubber-modified, polystyrene, from 5 to 15 parts of a graft interpolymer of an acrylic monomer with a polybutadiene rubber backbone. It is to be understood, however, that the present compositions can also include conventional amounts of conventional additives for processability, flame retardancy, stability and the like.

Preferred features of this invention are reinforced compositions containing reinforcing amounts of reinforcements, such as powders, whiskers, fibers or platelets of metals, e.g., aluminum, bronze, iron or nickel, and non-metals, e.g., carbon filaments, acicular $CaSiO_3$, asbestos, $TiO_2$, titanate whiskers, glass flakes and fibers and the like. Such reinforcements will be present in an amount of, e.g., 2 to 90% by weight, preferably 10 to 60% by weight. Especially preferred as a reinforcement is fibrous glass.

In preferred compositions the polyphenylene ether resins will be those having repeating structural units of the formula

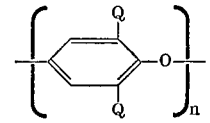

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. The preparation of polyphenylene ether resins corresponding to the above formula is described in the above-mentioned patents of Hay and Stamatoff. Especially preferred polyphenylene ether resins for purposes of the present invention are those having alkyl-substitution in the two positions ortho to the oxygen ether atom i.e., where each Q is alkyl, most preferably, having from 1 to 4 carbon atoms. The most preferred polyphenylene ether resin for purposes of the present invention is poly (2,6-dimethyl-1,4-phenylene)ether (each Q is methyl).

With respect to the acrylic resin component, poly (acrylic)resins are made by means well known to those skilled in the art are also available commercially. The acrylic resins are polymers or copolymers of acrylic acid, methacrylic acid, esters, e.g., alkyl esters, of these acids or acrylonitrile. These colorless monomeric liquid esters polymerize readily in the presence of light, heat or a catalyst, such as benzoyl peroxide, to high molecular weight polymers, e.g., molecular weights of 100,000 or more.

It is known in the art to modify such acrylic resins by blending with other polymers and by grafting acrylic resin chains or mixed acrylic monomers and vinyl aromatic monomers, e.g., styrene or vinyltoluene, onto a rubber backbone, blending such resins with other additives and the like. The acrylic resins contemplated by the present invention are those known in the art as the "rubber-modified acrylic resins," and, more particularly as "acrylic resin modified diene rubbers."

Depending on how they are made, preferred acrylic resin modified diene rubbers will generally be either (i) an interpolymer of an alkyl acrylic or methacrylic acid ester, e.g., methyl methacrylate, with a diene rubber, e.g., a polybutadiene, a copolymer of butadiene and styrene, etc., or (ii) a blend of an alkyl acrylic or methacrylic acid ester resin, e.g., poly(methyl methacrylate) and such a diene rubber. Such grafts and blends can also include a minor proportion of cografted vinyl aromatic monomer, e.g., styrene, vinyltoluene and the like.

The term "diene rubber" when used herein means a rubbery polymer or copolymer of a diene, e.g., butadiene or isoprene, with each other or with other conventional comonomers, such as vinyl aromatics, e.g., styrene, vinyl toluene and the like. The term includes natural rubber and synthetic diene rubbers, in all configurations. Preferred rubbers will comprise polybutadiene or a rubbery butadiene-styrene copolymer (about 72% BD–28% S).

Blends of the polyacrylate resin, e.g., poly(methyl methacrylate) and its homologs or analogs with the diene rubber can be made by co-extruding or milling the components, or by mixing latices and co-precipitating or by all other well known methods.

Interpolymers of acrylic monomers by grafting on diene rubber backbones can be made by well known grafting techniques, e.g., in bulk, suspension or emulsion systems. For example, butadiene or a mixture of butadiene and styrene monomers can be emulsion polymerized to form a diene rubber latex, e.g., polybutadiene or butadiene-styrene, and then, on top of this backbone, grafted resinous acrylic side chains can be built up by polymerizing an alkyl acrylate or methacrylate, or an acid or acrylonitrile. On the other hand, onto a diene rubber backbone, there can be grafted a mixture of monomeric alkyl methacrylate and either acrylonitrile and styrene, or both, all at once or sequentially. Suitable procedures are illustrated, for example, in Feuer, U.S. Pats. 2,857,360, 2,943,074, and will be illustrated in detail hereinafter.

In its broadest aspects, the acrylic resin modified diene rubber component can comprise from 80 to 20% by weight of acrylic monomer units, e.g., (lower)alkyl methacrylates, alicyclic methacrylate, alkyl acrylates or mixtures thereof, grafted onto a rubbery diene, e.g., butadiene or butadiene-styrene, and the like, polymer or copolymer backbone, from 20 to 80% and from 0 to 60% by weight of a polymerized vinyl aromatic compound, e.g., styrene, grafted onto the backbone, preferably, sequentially before the grafting of the acrylate.

Preferred acrylic resin modified diene rubbers for use as the respective component herein will contain from about 50 to about 85% by weight of acrylic resin component and from about 50 to about 15% by weight of the diene rubber and from 0 to 33% by weight of styrene resin. Especially preferred will be such components in the form of graft interpolymers which include from 65 to 75% by weight of grafted alkyl methacrylate units, from 35 to 25% by weight of a polybutadiene or rubbery butadiene styrene copolymer backbone and from 0 to 33% of grafted styrene units, preferably 5 to 33% of the latter.

One such resin is available commercially under the designation Acryloid KM–611 from Rohm & Haas Company, Philadelphia, Pa.

As noted above, the acrylic resin modified diene rubber may be added to polyphenylene ether resin or to a composition of a polyphenylene ether resin with an additional resin, preferably a polystyrene resin and most preferably, a high impact polystyrene resin. As disclosed in the above-mentioned U.S. 3,383,435, the styrene resin most readily combinable with the polyphenylene ether resin is one having at least 25% by weight polymer units derived from a vinyl aromatic monomer having the formula:

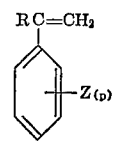

wherein R is a hydrogen, alkyl or from 1 to 4 carbon atoms or halogen; Z is a member selected from the class consisting of vinyl hydrogen, or alkyl or from 1 to 4 carbon atoms; and $p$ is from 1 to 5. Such compositions will comprise from 1 to 99% by weight of the polyphenylene ether component and from 99 to 1% by weight of the polystyrene resin. The preferred styrene resin for purposes of this invention is one comprising a rubber modified polystyrene, e.g., blended or grafted with from about 3 to 30, preferably from 4 to 12% by weight of a polybutadiene or rubbery copolymer, e.g., of about 70% butadiene and 30% styrene.

The amount of acrylic resin modified diene rubber added to the polyphenylene ether resin or blend thereof with polystyrene resin may vary within rather broad limits, but preferably ranges from about 1 to 25 parts by weight of the resinous components and most preferably, from 5 to 15 parts.

In a preferred family of compositions, the polyphenylene ether comprises at least 40 parts by weight, the polystyrene resin component comprises from 30 to 50 parts by weight and the acrylic resin modified diene rubber component comprises from 5 to 15 parts by weight. In especially preferred compositions the acrylic resin modified diene rubber component will have about a 30% content of polymerized diene, e.g., butadiene. Other preferred compositions will comprise about 40 to 95 parts of poly(2,6-dimethyl-1,4-phenylene)ether, 0 to 60 parts of high impact polystyrene and from about 5 to about 25 parts of a graft polymerization product of the acrylic monomer component of a mixture comprising an acrylic monomer and polybutadiene, the product containing about 30% by weight of polymerized butadiene and including grafted styrene monomer units in an amount corresponding to from 5 to 33% by weight of the polymerization product, all parts being by weight of the total resinous components in the composition.

It should be obvious that other additives may be present in the polymer composition such as plasticizers, pigments, flame retardants and stabilizers in amounts varying between about 1 and 30 percent by weight of the total composition. The above-stated range for the acrylic resin modified diene rubber, the polyphenylene ether resin and the polystyrene resin, if present, is based solely upon such resinous components in the polymer blend and excludes other additives.

The method of forming the polymer composition is not critical, prior art blending techniques being suitable. The preferred method comprises blending the polymers and additives, such as reinforcement in powder, granular and filamentous form—as the case may be—extruding the blend and chopping into pellets suitable for molding to shape by means conventionally used to mold normally solid rigid thermoplastics.

The following procedures illustrate methods whereby grafted interpolymers of an acrylic monomer onto polybutadiene rubber backbones suitable for use in the compositions of this invention can be prepared.

Procedure A (U.S. Pat. 2,943,074)

A diene rubber backbone is prepared by injecting the following ingredients into a reactor and polymerizing for 24 hours at 60° C.:

|  | Parts by weight |
|---|---|
| Butadiene-1,3 | 70 |
| Styrene | 30 |
| Water | 150 |
| Sodium lauryl sulfate | 5 |
| Potassium persulfate | 0.2 |
| Dodecyl mercaptan | 0.05 |

The unreacted monomer is removed from the latex by degasing under vacuum.

The following ingredients are agitated to form an emulsion.

|  | Parts by weight |
|---|---|
| Methyl methacrylate | 71.25 |
| Acrylonitrile | 3.75 |
| Butadiene-styrene copolymer latex solids (from above) | 25 |
| Water | 150 |
| Sodium lauryl sulfate | 3.75 |
| 2,2'-bis-azoisobutyronitrile | 0.075 |
| Dodecyl mercaptan | 0.49 |

Polymerization is carried out at 60° C. for 24 hours and the product is recovered by coagulation, washing and drying under vacuum.

Procedure B

Instead of the styrene-butadiene backbone, a polybutadiene backbone can be prepared by injecting the following ingredients into a reactor and polymerizing for 40 hours at 65° C.

|  | Parts by weight |
|---|---|
| Butadiene | 100 |
| Water | 80 |
| Sodium oleate | 1 3 |
| $K_2S_2O_8$ | 0.25 |
| Dodecyl mercaptan | 0.15 |
| NaOH | 0.014 |

[1] 1 part of soap is initially charged, followed by the remainder during the polymerization.

The acrylic monomer(s) are grafted onto this latex by the procedure described under A.

Procedure C

A diene rubber backbone is prepared by injecting the following ingredients into a reactor and polymerizing for 24 hours at 60° C.

|  | Parts by weight |
|---|---|
| Methyl methacrylate | 4 |
| Butadiene-1,3 | 78 |
| Styrene | 22 |
| Water | 150 |
| Sodium lauryl sulfate | 5 |
| Potassium persulfate | 0.2 |
| Dodecyl mercaptan | 0.05 |

Then 30 parts of styrene monomer containing 0.25 part of benzoyl peroxide is added and polymerization at 60° C. is continued to cause the styrene to graft onto the backbone. Finally 33 parts of methyl methacrylate is added to the emulsion and grafted onto the intermediate interpolymer. The product is recovered by coagulation, washing and drying.

Procedure D

By Procedure A a copolymer backbone latex is prepared from 71 parts of butadiene-1,3; 29 parts of styrene and 2 parts of methyl methacrylate. Then by the process of Procedure C (without using styrene), 68 parts of methyl methacrylate is grafted onto the backbone. The product is recovered by coagulating the reaction mixture with dilute brine and sulfuric acid, heating to 95° C. to produce partial granulation, filtering, and washing with water, then drying to a constant weight under a vacuum.

The acrylic content and the other components can be varied by making obvious adjustments in the recipes and blending ratios.

DESCRIPTION OF THE PREFERRED EMBODIMENTS

The benefits obtained by blending an acrylic resin modified rubber with a polyphenylene ether alone or in combination with another resin are illustrated in the following examples which are set forth as further description of the invention, but are not to be construed as limiting the invention thereto.

Unless otherwise indicated, all blends are prepared from the component materials by passing mixtures through a single-screw extruder with extrusion temperature maintained between 400° F. and 600° F., depending upon the particular materials used to make the blend. The strands emerging from the extruder are cooled, chopped into pellets and molded into test bars using standard procedures.

Examples 1 to 6

Blends are prepared according to the above procedures having compositions and properties as set forth in Table I:

TABLE 1.—COMPOSITIONS OF ACRYLIC RESIN-MODIFIED DIENE RUBBER, POLYPHENYLENE ETHER RESIN AND POLYSTYRENE RESIN

| Example | 1 (control) | 2 | 3 | 4 | 5 | 6 (comparison) |
|---|---|---|---|---|---|---|
| Formulation: |  |  |  |  |  |  |
| Polyphenylene ether [1] | 50 | 50 | 50 | 50 | 50 | 50 |
| Polystyrene [2] | 50 | 45 | 40 | 35 | 30 | 10 |
| Acrylic resin [3] | 0 | 5 | 10 | 15 | 20 | 40 |
| Fire retardant, stabilizer and processing additives | 5.65 | 5.65 | 5.65 | 5.65 | 5.65 | 5.65 |
| Physical properties: |  |  |  |  |  |  |
| Tensile strength, yield (p.s.i.) | 9,760 | 9,280 | 8,940 | 8,640 | 7,860 | 5,980 |
| Tensile strength, ultimate (p.s.i.) | 8,440 | 8,340 | 7,560 | 7,420 | 7,520 | 6,280 |
| Elongation (percent) | 41 | 47 | 48 | 26 | 55 | 73 |
| Flexural strength (p.s.i.) | 13,500 | 13,200 | 12,800 | 12,200 | 11,200 | 8,860 |
| Flexural modulus (p.s.i.) | 327,000 | 327,000 | 309,000 | 290,000 | 287,000 | 218,000 |
| Notched Izod (ft. lbs./in.) | 2.24 | 3.84 | 4.80 | 5.76 | 6.66 | 7.8 |
| Gardner impact (in. lbs.) | 170 | >240 | >240 | >240 | >240 | >240 |
| Heat distortion (° F.) | 245 | 250 | 256 | 260 | 264 | 264 |
| 45° gloss value | 61.4 | 61.6 | 61.5 | 60.4 | 59.4 | 56.0 |

[1] The polyphenylene ether used was poly(2,6-dimethyl-1,4-phenylene)ether.
[2] The polystyrene used was a high impact polystyrene identified as Lustrex HT-91 of Monsanto Chemical Co. containing about 6–10 percent polymerized butadiene.
[3] The acrylic resin used was an acrylic impact modifier resin identified as Acryloid KM-611 available from Rohm & Haas Company containing about 30 percent by weight polymerized butadiene, and comprising a graft polymer prepared by polymerizing methyl methacrylate in the presence of the preformed rubbery butadiene polymer (See C.F. Ryan, Technical Report, Rohm & Haas Co., Philadephia, Pa., the paper being presented on June 6-7, 1969 at the Seminar of Brooklyn Polytechnic Institute).

From the above table, it can be seen that as the concentration of the acrylic resin increases, impact strength (as measured by the notched Izod and Gardner tests)

increases dramatically. Moreover, even though polymerized butadiene content increases as a consequence of increasing the content of acrylic resin modifier, gloss value is not materially affected. Other properties are not appreciably altered, though there is some reduction in the tensile properties of the blend. Example 6 is included for comparison purposes to show that above 25% of acrylic modifier content (based on resinous components), certain properties tend to drop off.

Example 7

The procedure of Examples 1 to 6 may be repeated, substituting for the poly(2,6-dimethyl - 1,4 - phenylene)ether, poly(2-methyl-6-ethyl-1,4 - phenylene)ether, poly-(2,6-diethyl-1,4-phenylene)ether, or poly(2,6-dibutyl-1,4-phenylene)ether to obtain compositions according to this invention.

Examples 8 to 12

The procedure of Examples 1 to 6 is repeated with a modified composition and the results are set forth in Table 2:

purposes, above 25% of acrylic modifier content (based on resinous components) causes certain properties to drop off.

Examples 13 to 17

The procedure of Examples 1 to 6 is repeated with a modified composition with results set forth in Table 3:

TABLE 3.—COMPOSITIONS OF ACRYLIC RESIN-MODIFIED DIENE RUBBER AND POLYPHENYLENE ETHER RESINS

| Example | 13 (control) | 14 | 15 | 16 | 17 (comparison) |
|---|---|---|---|---|---|
| Formulation: | | | | | |
| Polyphenylene ether [1] | 100 | 95 | 85 | 75 | 60 |
| Acrylic resin [2] | | 5 | 15 | 25 | 40 |
| Physical properties: | | | | | |
| Tensile strength (yield, p.s.i.) | 11,200 | 10,900 | 10,060 | 9,300 | 8,140 |
| Elongation (percent) | 60 | 41 | 53 | 34 | 55 |
| Flexural strength, p.s.i. | 16,900 | 16,400 | 14,600 | 13,400 | 12,050 |
| Flexural modulus, p.s.i. | 378,000 | 362,000 | 321,000 | 307,000 | 275,000 |
| Izod impact strength, ft. lbs./in. notch | 1.44 | 2.48 | 7.12 | 6.88 | 5.80 |
| Gardner impact (in. lbs.) | 133 | 140 | >240 | >240 | >240 |
| Heat distortion temp., °F | 378 | 374 | 364 | 345 | 300 |
| 45° gloss value | 61.9 | 62.4 | 62.0 | 62.0 | 59.3 |

[1,2] Same as Examples 1–6.

The increases in impact strength resulting from the addition of acrylic resin modified diene rubber in the above examples is even more dramatic than in those compositions containing the polystyrene resin. Moreover, it should be noted that for the above examples, gloss value for those formulations containing the acrylic resin is in all cases not lower than the gloss value for the polyphenylene ether alone, except in the case of Comparative Example 17 where the butadiene rubber content is relatively large.

Examples 18 to 22

The procedure of Examples 1 to 6 is repeated with a modified composition with results set forth in Table 4;

TABLE 4.—COMPOSITIONS OF ACRYLIC RESIN-MODIFIED DIENE RUBBER, POLYPHENYLENE ETHER RESIN AND POLYSTYRENE RESIN

| Example | 18 (control) | 19 | 20 | 21 | 22 (comparison) |
|---|---|---|---|---|---|
| Formulation: | | | | | |
| Polyphenylene ether [1] | 45 | 45 | 45 | 45 | 45 |
| Polystyrene [2] | 55 | 50 | 40 | 30 | 15 |
| Acrylic resin [3] | | 5 | 15 | 25 | 40 |
| Physical properties: | | | | | |
| Tensile strength, yield (p.s.i.) | 9,725 | 9,385 | 8,505 | 7,945 | 6,380 |
| Tensile strength, ultimate (p.s.i.) | 7,885 | 7,885 | 7,465 | 7,145 | 6,450 |
| Elongation (percent) | 18 | 24 | 28 | 35 | 61 |
| Flexural strength, p.s.i. | 14,700 | 13,900 | 13,000 | 11,500 | 23,000 |
| Flexural modulus, p.s.i. | 346,000 | 315,000 | 302,000 | 268,000 | 230,000 |
| Izod impact strength (ft. lbs./in. notch) | 2.0 | 2.75 | 5.2 | 6.0 | 6.6 |
| Gardner impact (in. lbs.) | 48 | 210 | 240 | 240 | 240 |
| Heat distortion temp., °F | 261 | 264 | 268 | 273 | 279 |
| 45° gloss value | 59.7 | 58.5 | 60.0 | 57.4 | 54.3 |

[1,2,3] As in Examples 1–6.

TABLE 2.—COMPOSITIONS OF ACRYLIC RESIN-MODIFIED DIENE RUBBER, POLYPHENYLENE ETHER RESIN AND POLYSTYRENE RESIN

| Example | 8 (control) | 9 | 10 | 11 | 12 (Comparison) |
|---|---|---|---|---|---|
| Formulation: | | | | | |
| Polyphenylene ether [1] | 40 | 40 | 40 | 40 | 40 |
| Polystyrene [2] | 60 | 55 | 45 | 35 | 20 |
| Acrylic resin [3] | | 5 | 15 | 25 | 40 |
| Fire retardant, stabilizer and processing additives | 11.1 | 11.1 | 11.1 | 11.1 | 11.1 |
| Physical properties: | | | | | |
| Tensile strength, yield (p.s.i.) | 8,000 | 7,233 | 7,320 | 6,200 | 5,080 |
| Tensile strength, ultimate (p.s.i.) | 6,800 | 6,366 | 6,500 | 5,760 | 5,240 |
| Elongation (percent) | 38 | 38 | 37 | 54 | 66 |
| Flexural strength (p.s.i.) | 12,180 | 10,900 | 10,400 | 9,200 | 7,200 |
| Flexural modulus (p.s.i.) | 343,000 | 330,000 | 305,000 | 267,000 | 197,000 |
| Izol impact strength (ft. lbs./in. notch) | 1.84 | 2.96 | 5.78 | 7.76 | 9.2 |
| Gardner impact (in. lbs.) | 83 | 141 | >240 | >240 | >240 |
| Heat distortion temp. (°F.) | 212 | 210 | 210 | 210 | 210 |
| 45° gloss value | 62.9 | 63.8 | 62.2 | 60.0 | 59.3 |

[1,2,3] Same as Examples 1–6.

From the above table, it is apparent that impact strength (as measured by Izod and Gardner test procedures) substantially increases with increasing concentration of the acrylic resin. This is due to the presence of the polybutadiene in the acrylic resin component, although as can be seen from Example 12, which is included for comparison Marked increases in impact strengths are seen as the acrylic modifier content is increased. Some loss in tensile strength and in gloss is noted in compartive Example 22 where the modifier content is considerably in excess of the 25% contemplated by the present invention.

Examples 23–28

The following formulations are blended, molded and tested by the procedure of Examples 1–6:

| Example | 23 | 24 | 25 | 26 | 27 | 28 |
|---|---|---|---|---|---|---|
| Ingredients (parts by weight): | | | | | | |
| Poly(2,6-dimethyl-1,4-phenylene)ether [1] | 50 | 50 | 50 | 95 | 85 | 75 |
| Rubber modified polystyrene resin [2] | 40 | 35 | 30 | | | |
| Methyl methacrylate graft interpolymer with rubbery butadiene-styrenecopolymer [3] | 10 | 15 | 20 | 5 | 15 | 25 |

[1] [2] Same as Examples 1–6.
[3] Methyl methacrylate, 71.25 parts/acrylonitrile, 3.75 parts, grafted onto a backbone of butadiene/styrene (70–30), 25 parts, prepared according to Procedure A hereinabove and U.S. 2,943,074.

Compositions according to this invention are obtained.

The procedure of Examples 23–28 are repeated, substituting for the graft interpolymer with the butadiene-styrene backbone, a graft interpolymer of methylmethacrylate, 71.25 parts, acrylonitrile, 3.75 parts, on a butadiene rubber, 25 parts, prepared according to Procedure B hereinabove.

Compositions according to this invention are obtained.

The procedures of Examples 23–28 are repeated, substituting for the methyl methacrylate-acrylonitrile graft interpolymer, a graft interpolymer of methyl methacrylate onto a styrene grafted intermediate having a butadiene-styrene backbone and prepared according to Procedure C hereinabove.

Compositions according to this invention are obtained.

The procedures of Examples 23–28 are repeated, substituting for the methyl methacrylate-acrylonitrile graft interpolymer, a graft interpolymer of methyl methacrylate onto a rubbery butadiene-styrene-methyl methacrylate terpolymer backbone prepared according to Procedure D hereinabove.

Compositions according to this invention are obtained.

Examples 29–30

The following formulations are blended, molded and tested by the procedure of Examples 1–6:

| Example | 29 | 30 |
|---|---|---|
| Ingredients (parts by weight): | | |
| Poly(2,6-dimethyl-1,4-phenylene)ether [1] | 40 | 40 |
| Rubber modified styrene resin [2] | 25 | 15 |
| Methyl methacrylate graft interpolymer with rubbery butadiene-styrene copolymer [3] | 15 | 25 |
| Fibrous glass reinforcement, ¼″ [4] | 20 | 20 |
| Physical properties: | | |
| Tensile strength, ultimate (p.s.i.) | 12,500 | 11,200 |
| Flexural strength (p.s.i.) | 16,900 | 15,200 |
| Flexural modulus (p.s.i.) | 633,000 | 580,000 |
| Izod impact strength (ft. lbs./in. notch) | 1.4 | 1.5 |
| Heat distortion temp. (° F.) | 297 | 297 |

[1] [2] As in Examples 1–6.
[3] As in Examples 23–28 (and in U.S. 2,943,074).
[4] Owens Corning Fiberglas Corp., No. 883-1.

Glass reinforced compositions according to this invention are obtained.

Examples 31 and 32

The following formulations are blended, molded and tested by the procedure of Examples 1–6:

| Example | 31 | 32 |
|---|---|---|
| Ingredients (parts by weight): | | |
| Poly(2,6-dimethyl-1,4-phenylene)ether [1] | 50 | 85 |
| Rubber modified styrene resin [2] | 35 | |
| Acrylic modified diene resin [3] | 15 | 15 |

[1] [2] As in Examples 1–6.
[3] A physical blend of a resinous poly(methyl methacrylate), 70 parts, and a rubbery butadiene homopolymer, 30 parts.

Compositions according to this invenion are obtained.

Obviously, other modifications and variations of the present invention are possible in the light of the above teachings. It is, therefore, to be understood that changes may be made in the particular embodiments of the invention described which are within the full intended scope of the invention as defined by the appended claims.

What is claimed is:

1. A normally rigid thermoplastic composition comprising at least 40% by weight of a polyphenylene ether of the formula $$\left[ \begin{array}{c} Q \\ \phantom{}\\ Q \end{array} \bigcirc\!\!-\!\!O - \right]_n$$

wherein the oxygen ether atom of one unit is connected to the benzene nucleus of the next adjoining units; $n$ is a positive integer and is a least 50, and each Q is a monovalent substituent selected from the group consisting of hydrogen, halogen, hydrocarbon radicals, halohydrocarbon radicals having at least two carbon atoms between the halogen atom and phenyl nucleus, hydrocarbonoxy radicals, and halohydrocarbonoxy radicals having at least two carbon atoms between the halogen atom and phenyl nucleus and a normally rigid, resinous graft polymerization product of the acrylic monomer component of a mixture comprising from 80 to 20% by weight of an acrylic monomer selected from the group consisting of acrylic acid esters and methacrylic acid esters grafted on from about 20 to 80% by weight of a polymerized diene rubber said graft copolymer being present in an amount of from about 1 to about 25% by weight of the total resinous components of the composition.

2. A composition as defined in claim 1 wherein each Q is alkyl having 1 to 4 carbon atoms.

3. A composition as defined in claim 1 wherein each Q is methyl.

4. A composition as defined in claim 2 wherein the polyphenylene ether comprises at least 40 percent by weight of the total resinous components in said composition.

5. A composition as defined in claim 4 containing high impact polystyrene in addition to the polyphenylene ether and said graft polymerization product.

6. A composition as defined in claim 1 consisting of at least 40% by weight of said polyphenylene ether, from 1 to 25% by weight of said graft polymerization product and from 30 to 50% by weight of high impact polystyrene.

7. A composition as defined in claim 1 wherein said graft polymerization product contains from 5 to 33% by weight of grafted styrene monomer units.

8. A composition as defined in claim 7 wherein said graft polymerization product is of an acrylic monomer component of a mixture comprising an acrylic monomer and a styrene-butadiene copolymer.

9. A composition as defined in claim 1 wherein the graft polymerization product is of methyl methacrylate monomer with polybutadiene, said product containing about 30% by weight of polymerized butadiene.

10. A normally rigid thermoplastic composition comprising at least 40% by weight of a poly(2,6-dialkyl-1,4-phenylene)ether, from 1 to 25% by weight of a normally rigid, resinous graft polymerization product of the acrylic monomer component of a mixture comprising from about 80 to 20% by weight of an acrylic monomer selected from the group consisting of acrylic acid esters and methacrylic acid etsers grafted on from about 20 to 80% by weight of a polymerized diene rubber and the remainder a high impact polystyrene.

11. A composition as defined in claim 10 wherein the polyphenylene ether is poly(2,6-dimethyl-1,4-phenylene) ether.

12. A composition as defined in claim 10 wherein the polyphenylene ether comprises at least 40 parts by weight, the polystyrene comprises from 30 to 50 parts by weight and said graft polymerization product comprises from 5 to 15 parts by weight.

13. A composition as defined in claim 10 wherein said graft polymerization product is of an acrylic monomer with a polybutadiene, said product containing about 30% by weight of polymerized butadiene.

14. A composition as defined in claim 10 wherein said graft polymerization product contains from 5 to 33% of grafted polystyrene.

15. A normally rigid thermoplastic composition comprising at least 40% by weight of a polyphenylene ether of the formula

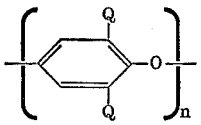

wherein the oxygen ether atom of one unit is connected to the benzene nucleus of the next adjoining units; $n$ is a positive integer and is at least 50, and each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus and from 1 to 25% by weight of a normally rigid, resinous graft polymerization product of the acrylic monomer component of a mixture comprising from 80 to 20% by weight of an acrylic monomer selected from the group consisting of esters of acrylic acid and esters of methacrylic acid grafted on from about 20 to 80% by weight of a polybutadiene rubber.

16. A composition as defined in claim 15 wherein said graft polymerization product is of an acrylic monomer with a polybutadiene, said product containing about 30% by weight of polymerized butadiene.

17. A composition as defined in claim 15 wherein said graft polymerization product is of an acrylic monomer with polybutadiene, the prouct also including grafted styrene monomer units in an amount corresponding to from about 5 to about 33% by weight of the resin.

18. A composition as defined in claim 16 wherein said graft polymerization product is of an acrylic monomer with polybutadiene, the product also including grafted styrene monomer units in an amount corresponding to from about 5 to about 33% by weight of the resin.

19. A composition as defined in claim 15 wherein said polyphenylene ether is a poly(2,6-dialkyl-1,4-phenylene) ether and comprises at least 40% by weight of the resinous components in the composition, said graft polymerization product comprises from 1 to 25% by weight of the resinous components in the composition, the remainder of the resinous components in the composition comprising a high impact polystyrene.

20. A composition as defined in claim 19 wherein said polyphenylene ether is poly(2,6-dimethyl-1,4-phenylene) ether.

21. A composition as defined in claim 20 wherein said poly(2,6 - dialkyl-1,4-phenylene)ether comprises at least 40 parts by weight, said high impact polystyrene comprises from 30 to 50 parts by weight and said graft polymerization product comprises from 5 to 15 parts by weight.

22. A normally rigid thermoplastic composition comprising from about 40 to about 95 parts of poly(2,6-dimethyl-1,4-phenylene)ether, from 0 to about 60 parts of high impact polystyrene and from about 5 to about 25 parts of a graft polymerization product of the acrylic monomer component of a mixture comprising from 80 to 20% by weight of an acrylic monomer selected from the group consisting of esters of acrylic acid and esters of methacrylic acid grafted on from about 20 to 80% by weight of polybutadiene, said product containing about 30% by weight of polymerized butadiene and including grafted styrene monomer units in an amount corresponding to from 5 to about 33% by weight of said graft polymerization product, all parts being by weight of the resinous components in said composition.

23. A reinforced composition as defined in claim 1 including a reinforcing amount of fibrous glass.

24. A reinforced composition as defined in claim 15 including a reinforcing amount of fibrous glass.

References Cited
UNITED STATES PATENTS

| | | | |
|---|---|---|---|
| 3,383,340 | 5/1968 | MacCallum | 260—3 |
| 3,383,435 | 5/1968 | Cizek | 260—874 |
| 3,639,506 | 2/1972 | Haaf | 260—876 R |
| 3,639,508 | 2/1972 | Kambour | 260—876 R |
| 3,663,654 | 5/1972 | Haaf | 260—876 R |
| 3,663,661 | 5/1972 | Katchman | 260—876 R |

PAUL LIEBERMAN, Primary Examiner

U.S. Cl. X.R.

260—3, 41.5 R, 879, 880 R, 892

PO-1050
(5/69)

UNITED STATES PATENT OFFICE
CERTIFICATE OF CORRECTION

Patent No. 3,792,123         Dated February 12, 1974

Inventor(s) Visvaldis Abolins et al

It is certified that error appears in the above-identified patent and that said Letters Patent are hereby corrected as shown below:

In Col. 12, line 14, "units" should read -- unit --;

In Col. 12, line 15, "a" (first occurrence) should read -- at --;

In Col. 12, line 44, after "from" insert -- 1 --; and

In Col. 13, line 17, "units" should read "unit --.

Signed and sealed this 5th day of November 1974.

(SEAL)
Attest:

McCOY M. GIBSON JR.
Attesting Officer

C. MARSHALL DANN
Commissioner of Patents